INVENTOR.
HAROLD A. OHLGREN
BY
Olsen and Stephenson
ATTORNEYS

United States Patent Office
3,346,678
Patented Oct. 10, 1967

3,346,678
PROCESS FOR PREPARING CARBON ARTICLES
Harold A. Ohlgren, 2920 Overridge Drive,
Ann Arbor, Mich. 48104
Filed Sept. 30, 1963, Ser. No. 312,761
6 Claims. (Cl. 264—29)

This invention relates generally to the manufacture of carbon, graphite and similar structures and more particularly to an improved process for manufacturing such article. As used herein, the term "article" is inclusive of shaped products, billets, tubes, blocks, etc.

Graphite is usually manufactured by mixing a carbonaceous material, such as petroleum coke, with a binder, such as pitch, and molding or extruding this plastic mixture to form an article of the desired shape. The shaped article is then baked to carbonize the binder material following which the article is graphitized by heating to a temperature of 4500°–5500° F. The density of the article may be increased by subjecting the baked article to one or more cycles of pitch impregnation and rebaking prior to graphitization. However, a substantial increase in the density of the article cannot be obtained by this method since pitch is too viscous to impregnate all the pores in the original shaped article and pitch contains a large number of giant molecular arrangements which limit the amount of carbon residue which can be obtained and thus do not allow any appreciable increase in the density of the article.

Furfuryl alcohol and similar impregnants have also been utilized in the past for this purpose. However, the autocatalytic nature of the polymerization of furfuryl alcohol has rendered its use less than completely practical in the densification of graphite. Also, the pressures developed within the graphite pores during polymerization, by the expanding vapors which are formed, tend to force the impregnant out of the pores and cut down the overall yield of carbonaceous residue. Furthermore, these internal pressures tend to crack and chip the graphite part being densified. In addition, since the crystals which form at least part of the ultimate article are formed during the processing steps which include heating to high temperatures, after the article has been shaped, internal stresses and strains are created in the article which tend to provide for chipping and fracture of the article during later machining, grinding, honing and similar operations.

It is an object of this invention, therefore, to provide an improved process in which raw materials in substantially powder form are processed through high temperatures to provide minute particles consisting of single whole crystals whose composition has the ultimate properties of the finished structural part, in which these crystals of predetermined size are coated with a selected binder so that each particle has a thin uniform thickness film thereon ideally approaching monomolecular thickness, in which additional binder either of the same composition or of a composition which interacts with the film composition in later steps to cross-tie and cross-link the crystals may be added to form a dense structure, and in which the coated crystals, either with or without additional binder are molded under vacuum conditions so that all gases and reaction products from the reaction and interaction of the film and binder are removed, and under a predetermined temperature-time program, so that the physical, chemical and thermal properties of the formed structure approach those ideal properties of the whole single crystals, and so that a dense article is formed in a single molding operation thereby eliminating the necessity for subsequent impregnation and heating steps.

Other objects of this invention are to provide a process which produces an article of the above type which has improved strength characteristics, is of an isotropic nature, has a controlled hydrogen content which ablates at high temperatures thereby enabling the manufacture of parts which can withstand high temperatures without objectionable shrinkage, which contains both an insulating binder and carbon black which is also insulating and the proportions of which are variable to thereby enable control of the thermal properties of the article, and which is relatively inexpensive to manufacture because expensive high temperature equipment and long processing times are avoided.

These and other desirable objects of this invention are accomplished by first processing the raw material over a predetermined temperature gradient at controlled rates so as to provide a powder comprised of the desirable single crystals. This powder is screened and mixed so as to obtain a mixture of particles extending over a predetermined size range. This powder material can then be densely compacted in forming the desired article because the smaller particles will fill the spaces between the larger particles, and the existence of the single whole crystals in the particles insures the obtaining of articles of uniform and improved strength characteristics. The powder is mixed with a carbon black following which it is coated with a selected binder. The binder may be either a dry powder resin binder or a thermosetting binder which is formed in situ. This coating may be accomplished by one of several methods such as ball milling or travel of the particles through a fluidized bed.

When desired in the final product, a composite particle, such as a carbon particle coated with a desired metal may be utilized. Such a particle is formed by causing carbon powder to flow through a continuous electric resistance furnace. A mixture of 90% silicon and 10% zirconium metal (both of which have been finely ground and thoroughly blended) is introduced into the furnace with the carbon powder. A 90% $SiCl_4$ and 10% $ZrCl_4$ mixture in the presence of argon diluent is introduced into the vapor and caused to flow countercurrent to the flow of the powder. Hydrogen gas is introduced into the furnace in quantities stoichiometric to 10% excess to cause chemical and thermal decomposition of the mixed metal chloride. The resultant carbon particles have a mixture of silicon and zirconium carbide on the surface thereof. Articles formed from these particles have improved strength and high temperature resistant qualities and do not readily oxidize. The carbon powder may also be processed in the presence of silicon metal, with silicon tetrachloride flowing in a direction counter to the direction of travel of the carbon powder. A silicon metal film is deposited on the surface of each particle at one end of the furnace and subsequently converted to silicon carbide as the powders enter the section of the furnace where temperatures are from 2800° F. to 4200° F., thus producing a finely divided powder which has a thin film of silicon carbide surrounding each carbon particle.

Articles constructed according to this invention are useful, because of the characteristics described above, in the aerospace, metallurgical, and chemical fields. In the aerospace field, such articles are useful as heat sinks, nozzle inserts, heat shields, leading edges, nose cones, etc. In the metallurgical field, these articles are useful as electrodes, anodes, crucibles, extrusion dies, resistance tubes, etc. In the chemical field these articles are useful as chemical tank liners, heat exchangers, pipes, ejector nozzles, etc.

Further objects, features and advantages of this invention will become apparent from a consideration of the following description, the appended claims, and the accompanying drawing in which:

Figure 1:
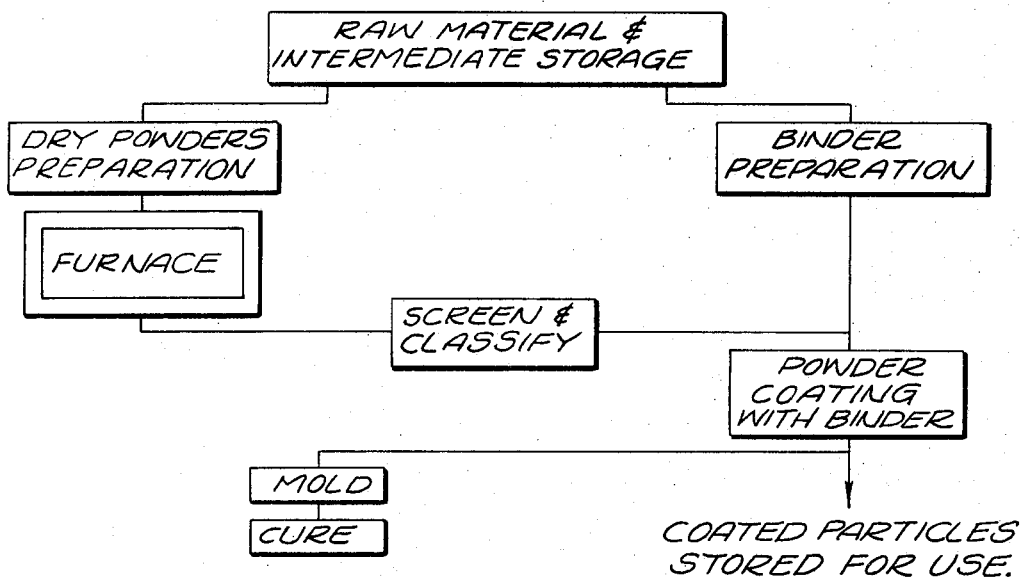
FIGURE 1 is a flow diagram illustrating the process of this invention.

In the process of this invention, raw petroleum coke, sometimes referred to as "green coke," is used as a starting material. This coke is calcined by loading it into boat crucibles which are then placed in a continuous resistance tube furnace capable of providing a temperature gradient along its length approaching a Bessel function. Each boat is moved through the furnace at a rate of 1″ to 4″ per minute depending upon the volatiles in the coke. The tube temperature is maintained at about 500° F. at its inlet and outlet ends and in its hot zone, about midway between its ends, the temperature is 2500°–3500° F. When boats of a size to hold 50–60 pounds of powder are used they are held for periods up to about one hour in the furnace hot zone. Nitrogen gas is used to start the furnace and as soon as the hydrocarbon gas generated in the furnace minimizes oxidation of the coke, the nitrogen is shut off. In cases in which graphite powders are to be used to form the article, the raw petroleum coke is simultaneously calcined and graphitized. In this case the hot zone of the tube furnace is at a temperature of 4000°–5000° F. and nitrogen is flowed continuously through the furnace. The boats are then moved through the furnace at the rate of from 1″ to 4″ per minute except in the hot zone where the boats can be held for periods of up to two hours.

In the improved method of this invention, when crystallites in calcined coke are to be formed, the raw coke containing boats are moved through the "heating up zone" of the furnace, namely, the zone where the temperature increases from 500° F. to 2500°–3500° F., over a six-twelve minute period so that the coke is gradually heated up to the hot zone temperature of 2500°–3500° F. The boats are held in the hot zone for fifteen-thirty minutes so that the carbon therein is maintained at the top temperature for this period. The boats are then moved through a "cool down zone" of the furnace over a period of six-twelve minutes, where the temperature of the formed carbon particles is reduced toward the 500° F. exit temperature.

When graphite crystals are to be formed the boats are kept in the "heat up zone" of from 500°–4500° F. for a fifteen-thirty minute period, in the hot zone of 4500°–5000° F. for thirty-sixty minutes, and in the "cool down zone" of from 4500°–500° F. for a fifteen-thirty minute period.

The advantage of this process for forming the material which goes into the improved article of this invention is that single whole crystals in calcined coke or graphite, as the case may be, are formed, several of which constitute each particle. This process insures the formation of the whole crystals of substantially uniform size and by decreasing the residence time of the raw material in the furnace smaller crystals can be formed. Commercial calcined coke and graphite can be used in the article and process of this invention but the resultant articles are less satisfactory from a strength standpoint and are not of uniform quality because the crystals in the commercial materials are crushed, broken and of uneven sizes.

The calcined coke or graphite is then crushed, screened, the oversized material is crushed again, and all the material is pulverized and then screened to obtain powders of varying particle size and as small as possible. In one embodiment of the invention, 2% of the powder is of sixty five mesh size, 8% is of a hundred mesh size, 17% is of one hundred fifty mesh size, 20% is two hundred mesh size, and 53% is minus two hundred mesh size.

The classified particles are then thoroughly blended with commercial carbon black and dehydrated carbon black additives (commercial carbon black which has been oven dried to later reduce resin hydrolysis). The preferred commercial carbon black is manufactured by the Thermatomic Division of H. T. Vanderbilt Corp., Shreveport, Louisiana and is identified by the trademark "Thermax." The carbon black, which is in the form of fine particles having diameters in the 0.2–0.4 micron range, is added because it is a good thermal insulator. It is a natural gas product and therefore has a structural arrangement of carbon atoms different than the arrangement in coke, thereby eliminating shrinkage or expansion during molding.

The mixed particles and carbon black are then coated with a binder. In the mixing, 60–85% by weight powder is combined with 6–10% by weight carbon black and 10–30% by weight binder. When a resin binder is utilized, a dry resin consisting mainly of phenol formaldehyde (60–80%) and phenol di-alcohol curative (20–40%) are utilized.

When a thermosetting binder is utilized, the binder can be formed concurrently with the coating of the carbon particles with the binder. The particles consist of a mixture (here identified as Mix #1) of graphite flour and carbon black in a proportion of seven-ten parts by weight of graphite for each part by weight of carbon black.

The following Mix #2 is prepared:

| Mix #2: | Lbs. |
| --- | --- |
| Phenol | 51 |
| Phthallic anhydride | 2 |
| Ethylene glycol | 5 |
| Amyl alcohol | 5 |

The following Mix #3 is prepared:

| Mix #3: | Lbs. |
| --- | --- |
| Paraformaldehyde | 29.0 |
| Acetone | 10.0 |
| Caustic | 0.5 |

One hundred pounds of Mix #1 is first thoroughly blended with Mix #2, following which Mix #3 is added and the temperature is raised to about 100° C. and maintained at that temperature until the solvent has evaporated. The resulting binder coated powder is molded immediately to the desired shape at pressures in the range of 1000 p.s.i. to 7500 p.s.i. while raising the temperature of the powders at a uniform rate to about 500° F. The molded part can be post cured at graphitizing temperatures if it is desired to convert the carbon atoms in the binder to graphite.

The powder, the carbon black, and the binder are thoroughly mixed in all cases to provide for a thin uniform coating of binder on each of the particles. This mixing may be accomplished in either of the two steps previously described. The particles, the carbon black and the binder can be ball milled for a period of four to six hours, or the particles may be caused to flow through a fluidized binder bed.

The binder coated particles may then be molded immediately into the desired structural shape, or they may be cooled and stored at a low temperature, such as 40° F., and low humidity conditions, such as 60% relative humidity, until their use is desired.

Figure 2:
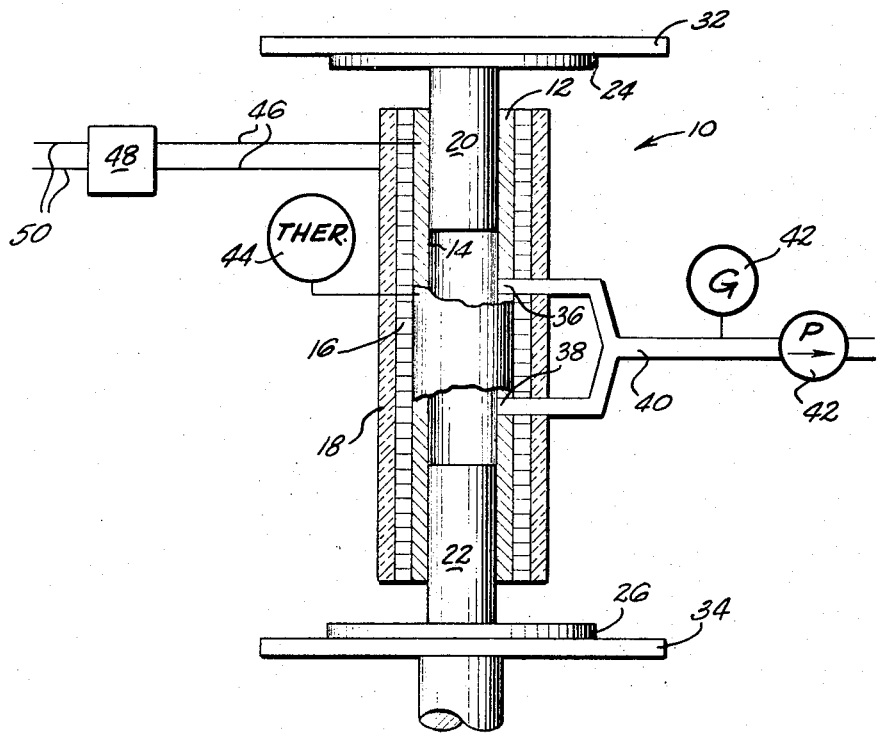
FIGURE 2 is a diagrammatic view of the molding system utilized in the process to form articles according to this invention.

The binder coated particles are molded in the vacuum mold system illustrated in FIG. 2 and indicated generally at 10. The system 10 includes a mold body 12 having an internal cavity 14 of a shape corresponding to the desired shape of the molded article. In the drawing the cavity 14 is shown of cylindrical shape for convenience of illustration. An electrical resistance heating element 16 surrounds the body 12 and insulation 18 is placed around the element 16. Removable pistons 20 and 22 are placed in opposite ends of the cavity 14 and plates 24 and 26 on the outer ends of the pistons 20 and 22 are positioned between and in engagement with the top and bottom platens 32 and 34, respectively, in a conventional press.

Vacuum ports 36 and 38 in the mold body 12 communicate through hose line 40 with a vacuum pump 42.

A gauge 42 connected to line 40 indicates pressure in line 40, and a temperature gauge 44 communicates with the cavity 14 between pistons 20 and 22 to indicate temperature therein. The heating element 16 is connected by conductors 46 to a suitable control panel 48, operable to control the temperature of element 16, which receives current through conductors 50 from a 30 amp, 110 volt source.

In the use of the system 10, the mold body 12 is preferably first preheated to about 200° F. A measured predetermined quantity of the coated particles, prepared as above described, are loaded into the mold cavity 14, the pistons 20 and 22 are moved toward each other, by operation of platens 32 and 34, to close opposite ends of cavity 14, and the temperature of the mold is raised 5° to 10° F. per minute until a temperature of 300°–600° F. is reached. During the temperature rise, the platens 32 and 34 are urged toward each other, or one is urged toward the other, with a force sufficient to exert a pressure in the 800 p.s.i.–10,000 p.s.i. range on the material in mold body 12. The mold is evacuated to a pressure in the range of 5″ to 29″ of mercury and the temperature of 300°–600° F. is maintained for a period of about three to five minutes. At the end of the five minute period the temperature is dropped, and the molded article is removed.

The final molded article is preferably post cured at 300°–600° F. for a period of one-four hours at atmospheric pressure to complete the cross linking of the components and to remove all water. If a fully carbonized article is desired, it is baked at a temperature of 1400°–1600° F., and if a fully graphitized article is desired it is re-graphitized at 3300°–5500° F. In a graphite containing body of 1.92 density, it was found that on post cure the density was reduced only to 1.90, and on graphitizing it was reduced only to 1.87.

If an ash free and sulphur free final article is desired from an ash and sulphur containing carbonaceous raw material, carbon tetrachloride, in stoichiometric quantities, is added to the furnace atmosphere during carbonizing or graphitizing of the raw material to form the powder crystallites. This results in the formation of volatile sulphur chlorides and sulphur oxychlorides, and volatile chlorides of the ash constituents and the refractory metals and metal compounds in the raw material. These volatiles are removed from the furnace and thus from the final powders.

The following specific examples will serve to illustrate the invention but they are not to be considered limiting:

EXAMPLE I

The following components in the proportions listed were provided:

Percent by weight
Crystallite coke flour (prepared in a resistance tube furnace as above described) ------------------ 72
Carbon black ---------------------------------- 8
Durez 8839 (a phenol-formaldehyde resin of two step type manufactured by Hooker Chemical Corp., Niagara Falls, N.Y., U.S.A.) ------------------ 15
Catalin 9273 (a phenol di-alcohol curative manufactured by Catalin Corp., New York, N.Y., U.S.A.) _ 5

The coke flour is crushed and screened so that more than 50% thereof will pass a 200 mesh screen, and the balance thereof is of varying size up to a size that will pass a 65 mesh screen. The carbon black is in a commercial very fine powder size, and the phenol-formaldehyde resin is pulverized to an extent such that 99% will pass a 200 mesh screen. The di-alcohol curative resin is an oil soluble, heat reactive, phenolic resin which is stored in lump form and is milled to a size such that at time of use substantially all of the particles thereof will pass a 50 mesh screen.

The finely divided phenol di-alcohol is ball milled with the minus 200 mesh phenol formaldehyde to assure complete binder homogeneity. Following milling the binder is pulverized so that it will pass a 200 mesh screen.

The binder, coke flour and carbon black were then intimately mixed by ball milling for five hours. The binder becomes fluid at a temperature of about 65° C., and the friction caused by the moving particles and the balls in the mill generates sufficient heat to raise the temperature of the binder to at or about 65° C. As a result, the binder becomes intimately mixed with the carbon particles and provides a thin uniform binder coating on the particles.

The resulting coated powder was placed in the mold cavity 14, after the mold body had been preheated to 200° F. The pistons 20 and 22 were moved toward each other with sufficient force to apply a pressure of 6000 p.s.i. to the coated powder in the mold. The control element 48 was operated to raise the mold temperature 10° F. per minute until a final temperature of 600° F. was reached. Simultaneous with the temperature rise, the pump 42 was operated to draw a high vacuum and remove air, gases and reaction products from the cavity 14 through ports 36 and 38. By raising the temperature above about 350° F., which it has been found is a critical temperature area because the exotherm products of polymerization are greatest and most violent in this area, a dimensionally stable article is obtainable. The mold was then cooled and the molded cylinder removed.

The final article had the following characteristics:

Density—1.90 grams per cubic centimeter
Compressive strength—25,000–30,000 p.s.i.
Thermal conductivity—5.0 B.t.u./hr./ft.$^2$/°F./ft.
Coefficient of thermal expansion—$10 \times 10^{-5}$ in./° F.

In the above example, the binder constitutes 20% by weight of the total mix. The binder content may be varied in the range of 10%–30% with satisfactory results in the final article which may have a density of 1.70–1.95. However, it has been found that the compressive strength of the article is reduced when the binder content is below or above a range of 18%–22%, and for this reason a binder content in this range is preferred.

EXAMPLE II

The following components in the proportions listed, were provided:

Percent by weight
Graphitized flour (prepared in a resistance tube furnace as above described) -------------------- 72
Carbon black ---------------------------------- 8
Durez 8839 ----------------------------------- 15
Catalin 9273 ---------------------------------- 5

The above components were processed, mixed and molded as in Example I. The resultant product had a density of 1.90, a compressive strength of 24,000 p.s.i., a thermal conductivity of 6.5 and a coefficient of thermal expansion of $8 \times 10^{-5}$.

EXAMPLE III

The following powder mixture was provided:

Lbs.
Calcined coke flour ---------------------------- 80
Graphite flour -------------------------------- 10
Carbon black --------------------------------- 10

100

The following binder formulation was provided:

Lbs.
Vinyl chloride polymer ------------------------- 20
Pitch ---------------------------------------- 77
Paraffin ------------------------------------- 1
Stearic acid ---------------------------------- 2

100

The powder mixture and the binder components were thoroughly mixed, the mix was preformed in a room temperature mold at a pressure of 2000 p.s.i. to reduce the bulk, and then recrushed to a coarse powder. The resulting power was then molded in the cavity 14 at a temperature of 245° F., and a pressure of 4000 p.s.i., and the cavity 14 is evacuated as previously described. A mold temperature in the 200°–300° F. range may be used and the pressure may be in the 1000–4000 p.s.i. range with satisfactory results. The mold was cooled to 100° F., the molded article was removed, and subsequently cured at a temperature of about 500° F. for twenty hours. The article was subsequently baked at about 1400°–1500° F. and then graphitized in the presence of nitrogen gas at a temperature of about 4400°–4800° F.

In the final article, the binder has been converted to graphite so that the article is fully graphitized. In the above example it is to be understood that any fatty acid can be substituted for the stearic acid with satisfactory results.

EXAMPLE IV

Identical to Example II except that the percent crystallites of graphite flour was reduced to 70% and 2% pitch was added. The components were processed and molded the same as in Example II and the resulting article was identical except that it had a higher hydrogen content because the grain size was increased slightly. As a result, the article has a higher ablation rate because an increased amount of hydrogen is released when the article is subjected to high temperatures, such as when used as an exhaust nozzle. This increased hydrogen release is useful in providing a boundary layer of cooling gas.

EXAMPLE V

A finely ground thoroughly blended mixture of 90% silicon and 10% zirconium metal powder is mixed with about an equal amount of carbon particles prepared as above described. This mixture is caused to flow in one direction through a continuous electric resistance furnace having temperatures varying from about 400° C. at inlet and exit ends to about 2200° C. at its center. Vaporized 90% $SiCl_4$ and 10% $ZrCl_4$ in the presence of argon diluent is flowed through the furnace in an opposite direction. Hydrogen gas is introduced in quantities stoichiometric to 10% excess to cause chemical and thermal decomposition of the mixed metal chlorides as follows:

$$SiCl_4 + heat \rightarrow Si + 2Cl_2$$
$$SiCl_4 + 2H_2 + heat \rightarrow Si + 4HCl$$
$$ZrCl_4 + heat \rightarrow Zr + 2Cl_2$$
$$ZrCl_4 + 2H_2 + heat \rightarrow Zr + 4HCl$$

Metal deposition from the halides begins at 400° C. in the hydrogen gas and thermally decomposes at temperatures of 1100° C. to 2200° C. without recombination. Thus, as the carbon moves through the furnace silicon and zirconium metal is deposited thereon and as the carbon approaches the hottest zone of the furnace thermal decomposition causes deposit of more metal and this metal film is converted to silicon carbide-zirconium carbide binary. As temperatures reach 1800°–2200° C., the thermally decomposed halide and vapor deposited metal carburize, and as the material moves into the cool down zone a final film of bonding metal forms on the carbide particle surfaces. The resulting powder removed from the furnace is coated with a binary carbide with micro cracks sealed with the zirconium and silicon metal.

The resulting powders are binder coated and molded as described in Example I, and the resulting article has the advantage of increased strength and better temperature resistance as well as being more resistant to oxidation.

From the above description it is seen that this invention provides improved molded articles and methods for economically manufacturing such articles. The powder articles from which the article is formed are of a range of sizes as small as possible, preferably in the .08 to 150 micron range. The particular size classification is not critical so long as a range of sizes are employed. The resulting article has high strength, hardness and ablative characteristics controlled by the utilization of the phenol di-alcohol curative.

The binder system of this invention films each filler particle with a uniform thickness film of binder and also provides a molded structure conforming to the dimensions of the mold die with no shrinkage or expansion. These advantageous results are obtained by providing a phenol formaldehyde having the following properties:

Desired phenol-aldehyde properties

| | |
|---|---|
| Contraction point, ° C. | 60–67.5 |
| Cure rate @ 165° C. (sec.) | 45–55 |
| Cure rate @ 165° C. (sec.) | 23–29 |
| Initial raw flow (mm.) | 55–60 |
| Particle size designation | Minus 200 mesh |

A controlled addition of a phenol di-alcohol resin, which is oil soluble and heat reactive, to the phenol formaldehyde, provides for proper binder cure with maximum cross links and minimal polymer linearization. The phenol di-alcohol has properties in the following ranges:

| | |
|---|---|
| Softening point, ° C. | 75.0–95.0 |
| Softening point (capillary), ° C. | 55.0–75.0 |
| Specific gravity @ 25° C. | 1.025–1.04 |
| Methylol groups, percent | 8–13.0 |

This cross-linking of the binder molecules, which renders a final molded product of isotropic nature, is believed to be obtained as follows:

The basic monomeric structure of a specific phenol di-alcohol such as 2.5 di-methylol phenol is represented as:

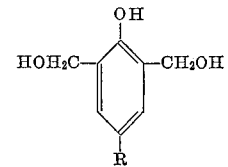

wherein R represents any organic radical from $CH_2$ to $C_nH_{2n}$. When heated the above di-alcohol condenses to:

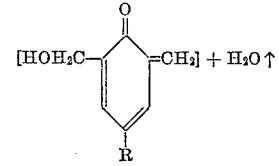

Indicating phenol formaldehyde as PA, when the above di-alcohol is mixed with phenol formaldehyde and heated cross-linking of the molecules in a three-dimensional structure is obtained as follows:

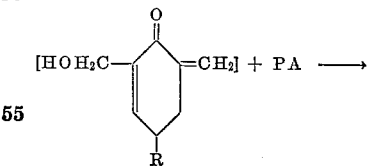

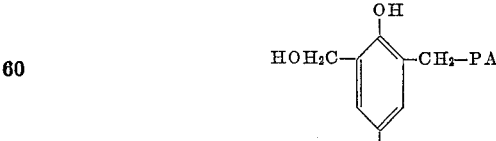

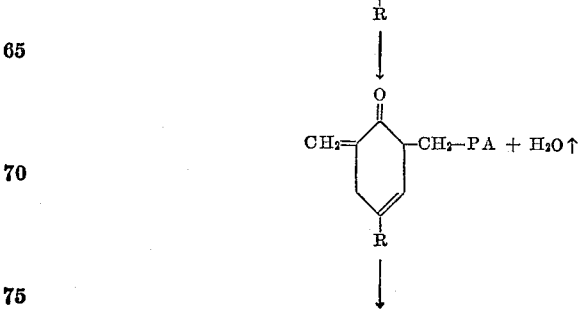

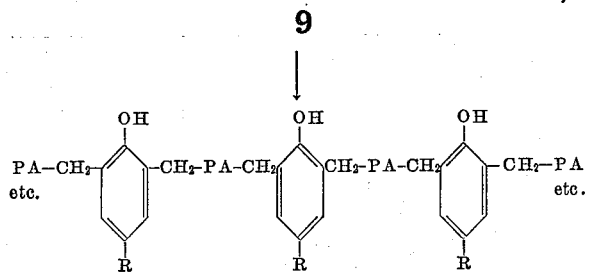

In the above reaction if the phenol formaldehyde is represented by its chemical formula, it is believed that the reaction proceeds as follows:

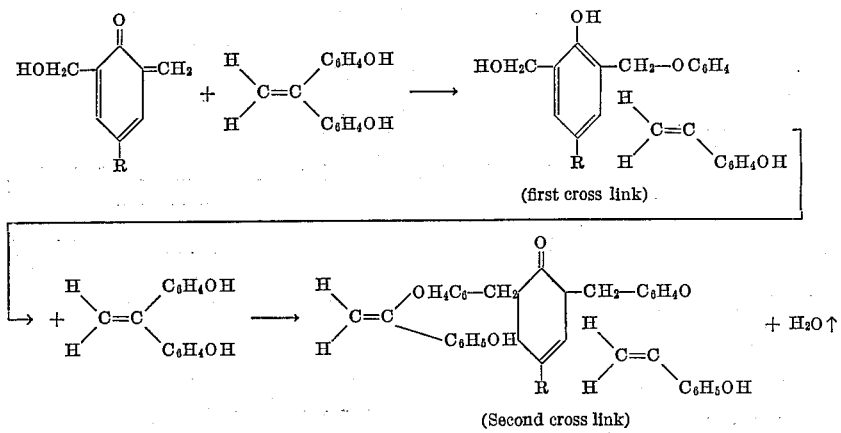

In the presence of heat during molding it is believed that reaction proceeds as follows from the second cross link, to obtain the final infusible resin:

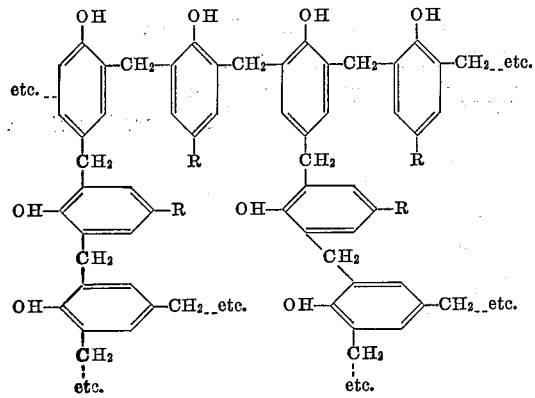

It has been found that from 20% to 30% of the weight of the binder must be made up of the phenol di-alcohol to obtain the desired properties in the final molded products disclosed herein.

It will be understood that the articles and the processes for preparing these articles which are herein disclosed and described are presented for purposes of explanation and illustration and are not intended to indicate limits of the invention, the scope of which is defined by the following claims.

What is claimed is:

1. The process for manufacturing a molded carbon article comprising the steps of:
   (a) preparing a carbon powder having particles varying in size;
   (b) preparing a binder consisting of from 60%–80% phenol formaldehyde and 20%–40% phenol di-alcohol;
   (c) intimately mixing said powder and binder in a proportion of 70%–90% by weight powder and 10%–30% by weight binder so as to coat said particles with said binder;
   (d) molding said coated powder under a pressure in the 800–10,000 p.s.i. range at an initial temperature of 175°–225° F;
   (e) evacuating gases and reaction products from said coated powder during molding;
   (f) gradually increasing the molding temperature 5°–10° F. per minute until a final temperature of 300°–600° F. is reached;
   (g) post curing the molded article at substantially atmospheric pressures at a temperature in the 300°–600° F. range for a period of one–four hours; and
   (h) further heating said article above said curing temperature at a temperature sufficient to fully carbonize or graphitize the article contents.

2. The process for manufacturing a molded carbon article comprising the steps of:
   (a) preparing a powder consisting of 7–10 parts carbon particles varying in size, and 1 part carbon black;
   (b) preparing a binder consisting of from 60%–80% phenol formaldehyde and 20%–40% phenol di-alcohol;
   (c) mixing said powder and binder in a proportion of 70%–90% by weight powder and 10%–30% by weight binder;
   (d) ball milling said mixture for a time sufficient to obtain a distribution of powder particles in the size range of .08 micron to 150 microns and to obtain a coating of said binder on said particles;
   (e) molding said coated powder under a pressure in the 800–10,000 p.s.i. range at an initial temperature of 175°–225° F.;
   (f) evacuating gases and reaction products from said coated powder during molding; and
   (g) gradually increasing the molding temperature 5°–10° F. per minute until a final temperature of 300°–600° F. is reached.

3. The process for manufacturing a molded article consisting primarily of graphite comprising the steps of:
   (a) preparing a graphite powder having particles varying in size;
   (b) mixing said graphite powder with carbon black in a proportion of from 7–10 parts by weight graphite for each part of carbon black;
   (c) preparing a binder consisting of from 60%–80% phenol formaldehyde and 20%–40% phenol di-alcohol;
   (d) mixing said graphite and carbon black powder and said binder in a proportion of 78%–82% by weight powder and 18%–22% by weight binder;
   (e) ball milling said mixture for a time sufficient to obtain a distribution of powder particles in the size range of .08 micron to 150 microns and to obtain a coating of said binder on said particles;
   (f) molding said coated powder under a pressure in the 800–10,000 p.s.i. range at an initial temperature of 175°–225° F.;
(g) evacuating gases and reaction products from said coated powder during molding; and
(h) gradually increasing the molding temperature 5°–10° F. per minute until a final temperature of 300°–600° F. is reached.

4. In a process for preparing a molded powder article; the steps comprising:
(a) providing a blended mixture of finely ground powder consisting essentially of about 90% silicon and 10% zirconium;
(b) mixing carbon particles with said silicon and zirconium mixture;
(c) heating said mixture from about 400° C. to 2200° C. in the presence of vaporized $SiCl_4$ and $ZrCl_4$ and hydrogen gas to obtain graphite particles provided with a film of silicon carbide-zirconium carbide binary;
(d) cooling said powder to room temperature;
(e) mixing said powder with a resin binder; and
(f) vacuum molding said powder and binder under pressure and at predetermined temperatures.

5. In a process for preparing a molded powder article; the steps comprising:
(a) providing a powder consisting of graphite particles coated with a metal carbide;
(b) mixing said powder with a resin binder consisting of a mixture of 60%–80% phenol formadehyde and 20%–40% phenol di-alcohol curative in an amount 78%–82% by weight powder and 18%–22 by weight resin;
(c) raising the temperature of said binder above 65° C. during said mixing so as to fluidize said binder and coat said particles therewith; and
(d) vacuum molding said powder and binder under pressure and at predetermined temperatures.

6. The process for manufacturing a molded article comprising the steps of:
(a) preparing a carbon containing powder having particles varying in size;
(b) mixing pitch with said powder in a quantity sufficient to constitute about 2% by weight of said powder;
(c) preparing a binder consisting of from 60%–80% phenol formaldehyde and 20%–40% phenol di-alcohol;
(d) mixing said powder and binder in a proportion of 78%–82% by weight powder and 18%–22% by weight binder;
(e) ball milling said mixture for a time sufficient to obtain a distribution of sizes of said powder particles and to obtain a coating of said binder on said particles;
(f) molding said coated powder under a pressure in the 800–10,000 p.s.i. range at an initial temperature of 175°–225° F.;
(g) evacuating gases and reaction products from said coated powder during molding; and
(h) gradually increasing the molding temperature 5°–10° F. per minute until a final temperature of 300°–600° F. is reached.

References Cited
UNITED STATES PATENTS

| | | | |
|---|---|---|---|
| 1,804,052 | 5/1931 | Haas | 260—38 X |
| 2,563,285 | 8/1951 | Shea et al. | 106—56 X |
| 2,589,582 | 3/1952 | Strughold et al. | |
| 3,197,527 | 7/1965 | Krummeich | 264—29 |
| 3,244,648 | 4/1966 | Bornstein | 260—38 X |
| 3,246,056 | 4/1966 | Shea et al. | 264—29 |

FOREIGN PATENTS 913,233  12/1962  Great Britain.

OTHER REFERENCES

Campbell et al.: Vapor Deposition of Refractory Materials, Journal of The Electrochemical Society, November 1949, TP 250–A 54, pages 318–333. (Copy available in class 23, sub-class 208 A.)

ROBERT F. WHITE, *Primary Examiner.*

MORRIS LIEBMAN, *Examiner.*

A. LIEBERMAN, J. A. FINLAYSON,
*Assistant Examiners.*